(12) United States Patent
Savage et al.

(10) Patent No.: US 9,818,162 B2
(45) Date of Patent: Nov. 14, 2017

(54) SOCIALLY AND CONTEXTUALLY APPROPRIATE RECOMMENDATION SYSTEMS

(71) Applicant: Intel Corporation, Santa Clara, CA (US)

(72) Inventors: Norma S. Savage, Santa Barbara, CA (US); Lama Nachman, Santa Clara, CA (US); Saurav Sahay, Santa Clara, CA (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 14/316,878

(22) Filed: Jun. 27, 2014

(65) Prior Publication Data
US 2015/0379406 A1    Dec. 31, 2015

(51) Int. Cl.
| G06F 17/00 | (2006.01) |
| G06Q 50/00 | (2012.01) |
| G06Q 30/02 | (2012.01) |
| G06Q 30/06 | (2012.01) |

(52) U.S. Cl.
CPC .......... *G06Q 50/01* (2013.01); *G06Q 30/02* (2013.01); *G06Q 30/0631* (2013.01)

(58) Field of Classification Search
None
See application file for complete search history.

(56) References Cited

U.S. PATENT DOCUMENTS

| 2008/0027924 | A1  | 1/2008  | Hamilton et al. |
| 2010/0257131 | A1  | 10/2010 | Kim et al. |
| 2011/0004481 | A1* | 1/2011  | Jones ................ G06F 3/011 705/1.1 |
| 2011/0320395 | A1* | 12/2011 | Dada ................ G06Q 30/02 706/47 |
| 2013/0066819 | A1  | 3/2013  | Nice et al. |
| 2013/0275429 | A1* | 10/2013 | York ................ G06F 17/30029 707/737 |
| 2014/0013353 | A1  | 1/2014  | Mathur |
| 2014/0164404 | A1* | 6/2014  | Hunt ................ G06F 17/30867 707/754 |

(Continued)

FOREIGN PATENT DOCUMENTS

KR    20140047312 A    4/2014

OTHER PUBLICATIONS

Liu et al. "Point-of-Interest Recommendation in Location Based Social Networks with Topic and Location Awareness", SIAM, 2013, pp. 396-404.*

(Continued)

*Primary Examiner* — Li-Wu Chang
(74) *Attorney, Agent, or Firm* — Jordan IP Law, LLC

(57) ABSTRACT

Systems and methods may provide for conducting an interest analysis of data associated with a user, wherein the interest analysis distinguishes between abstract interests and social interests. Additionally, one or more recommendations may be generated for the user based on the interest analysis and a current context of the user, wherein the one or more recommendations may be presented to the user. In one example, the abstract interests identify types of topics and types of objects, and the social interests identify types of social groups.

15 Claims, 7 Drawing Sheets

(56) References Cited

U.S. PATENT DOCUMENTS

2014/0280108 A1* 9/2014 Dunn ................ G06F 17/30699
　　　　　　　　　　　　　　　　　　　　707/728
2015/0058417 A1* 2/2015 McConnell ........... H04L 67/306
　　　　　　　　　　　　　　　　　　　　709/204

OTHER PUBLICATIONS

Choudhury, et al., "What Makes Conversations Interesting?: Themes, Participants and Consequences of Conversations in Online Social Media", May 1, 2009, 29 pages.
Dietz, et al., "De-Layering Social Networks by Shared Tastes of Friendships", 2012, 4 pages.
Ido et al., "Social Media Recommendation based on People and Tags", 2010, pp. 194-201.
Wikipedia, "Clique Percolation Method", Clique percolation method—Wikipedia, the free encyclopedia, Mar. 16, 2014, pp. 1-5.
International Search Report and Written Opinion for International Patent Application No. PCT/US2015/035728, dated Aug. 31, 2015, 11 papes.

* cited by examiner

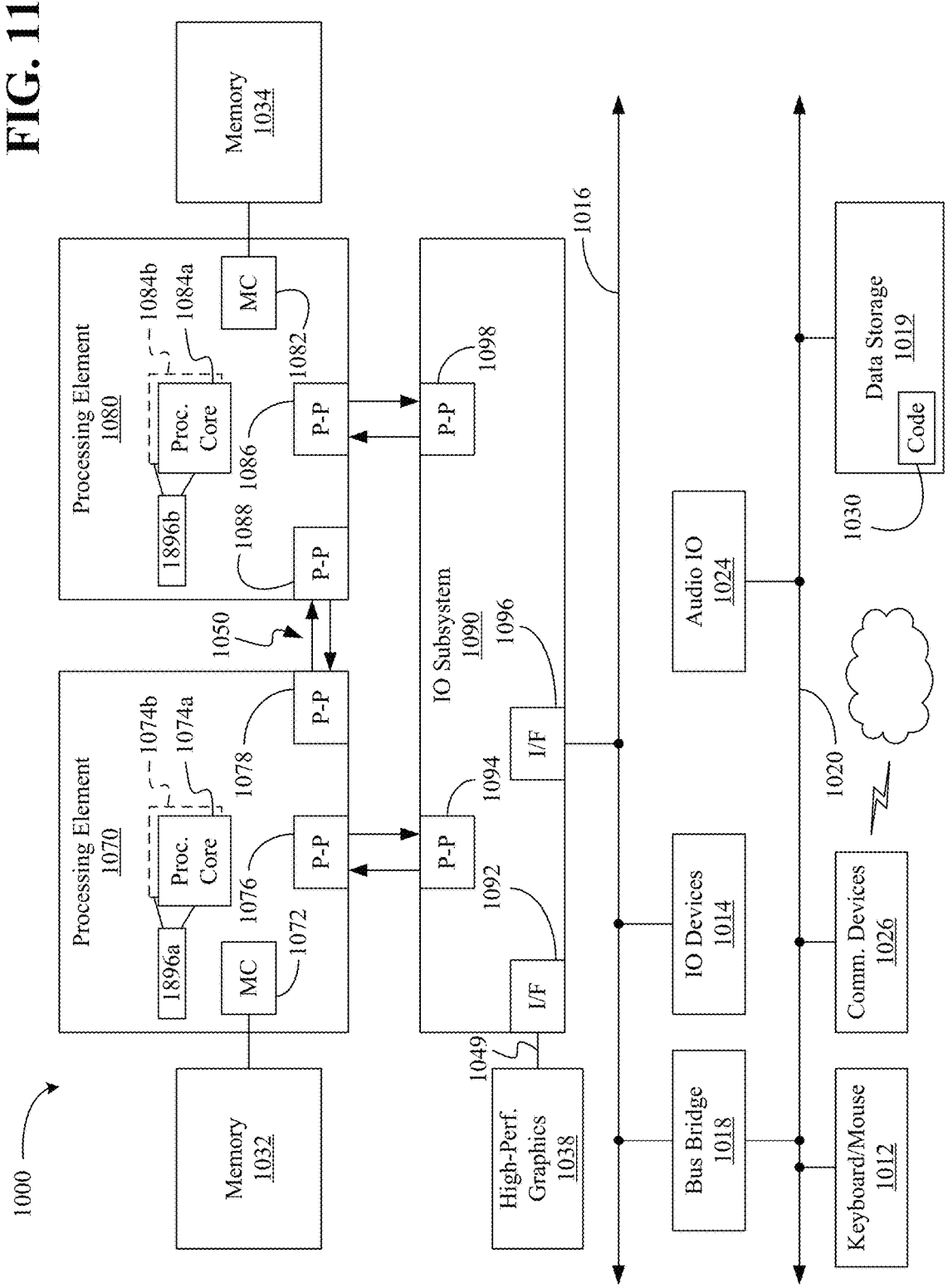

SOCIALLY AND CONTEXTUALLY APPROPRIATE RECOMMENDATION SYSTEMS

TECHNICAL FIELD

Embodiments generally relate to recommendation systems. More particularly, embodiments relate to socially and contextually appropriate recommendation systems.

BACKGROUND

Recommendation systems may be deployed in a variety of applications such as social networking sites (e.g., FACEBOOK), search engines (e.g., BING), video sharing sites (e.g., YOUTUBE), electronic commerce (e-commerce) sites (e.g., AMAZON.COM), and so forth, wherein content may be recommended to users based on the users' past online activity. Conventional solutions, however, may recommend content that is appropriate for a user from one perspective but inappropriate for the user from another perspective. For example, particular content might be recommended to a user due to the type of content (e.g., the content is associated with a favorite genre and/or subject matter of the user), whereas that content may be undesirable to the user from a social perspective (e.g., the content originates from a group of individuals disliked by the user). Additionally, content may be recommended to a user due to the social relevance of the content (e.g., the content originates from a favorite social group of the user), whereas the type of content might be undesirable from the user's perspective. Moreover, conventional systems may recommend content that is appropriate for a user at one moment in time but is inappropriate at another moment in time (e.g., due to the user's social setting and/or surroundings).

BRIEF DESCRIPTION OF THE DRAWINGS

The various advantages of the embodiments will become apparent to one skilled in the art by reading the following specification and appended claims, and by referencing the following drawings, in which:

FIG. 11 is a block diagram of an example of a system according to an embodiment.

DESCRIPTION OF EMBODIMENTS

Figure 1:
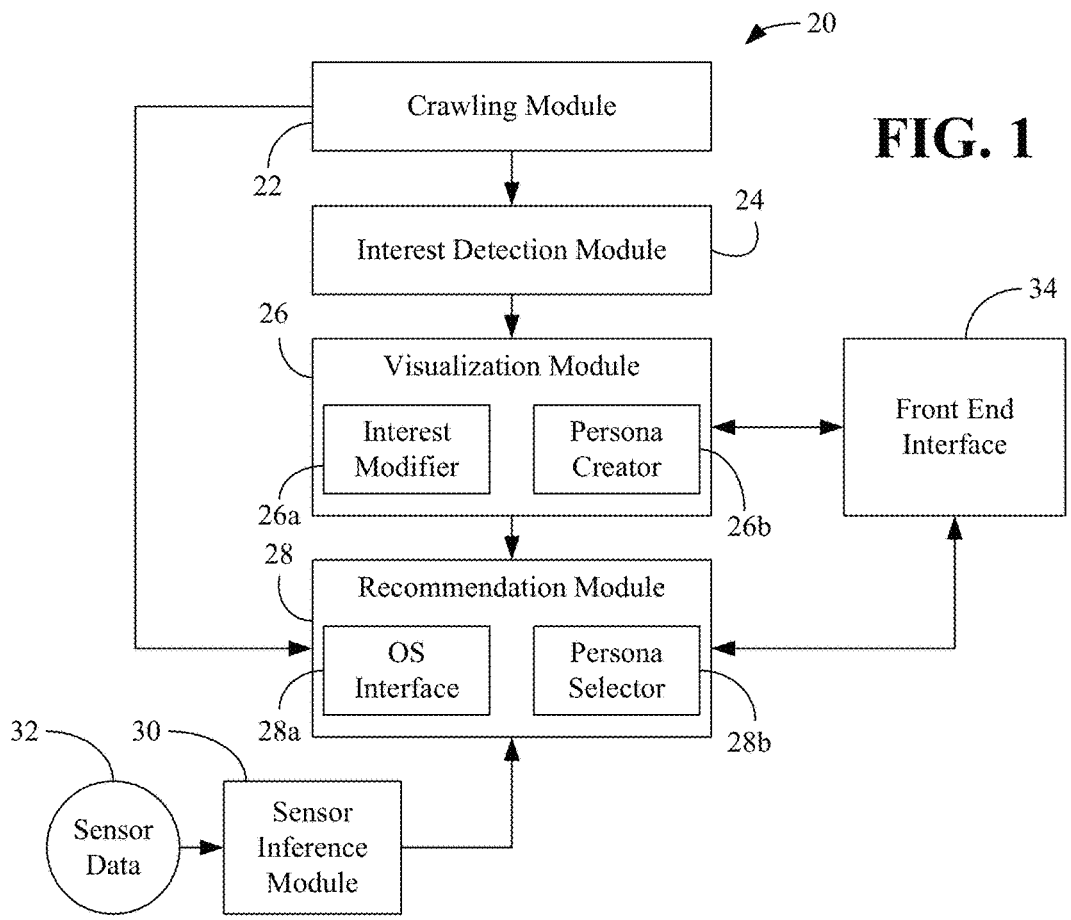
FIG. 1 is a block diagram of an example of a recommendation pipeline according to an embodiment.

Turning now to FIG. 1, a recommendation pipeline 20 is shown. The pipeline 20 may generally include a crawling module 22, an interest detection module 24, a visualization module 26 (26*a*, 26*b*), a recommendation module 28 (28*a*, 28*b*), a sensor inference module 30 and a front end interface 34. The illustrated crawling module 22 collects data (e.g., tags, comments, "likes", geo-location details, etc.) from one or more of a social network, an online profile, a posted document or an authored document, wherein the collected data is associated with a user. More particularly, the crawling module 22 may collect user posts, photos, etc., along with their corresponding tags, comments, time of day, geo-location details, and so forth, on a static (e.g., periodic) or dynamically determined time basis.

For example, the crawling module 22 might determine the number of likes received by the photos and other content posted online by a user and her friends wherein, from this data the crawling module 22 may calculate the average sharing rate of the group as the time difference between content posts. The average sharing rate may then be used to determine how often to collect content from the group in question. The crawling module 22 may also subscribe to content from a particular content provider (e.g., user, web site, etc.), calculate the average sharing rate of the content provider, and use the average sharing rate to determine how often to collect content from the content provider. The data collected by the crawling module 22 may provide broad ranging insight into the user's preferences, relationships, and/or habits.

The interest detection module 24 may generally conduct an interest analysis of the collected data, wherein the interest analysis distinguishes between abstract interests and social interests. More particularly, the abstract interests may identify types of topics (e.g., genres, themes, subject matters) and types of objects (e.g., documents, video, audio, calendar events), whereas the social interests may identify types of social groups (e.g., family members, co-workers, neighbors and other groups). As will be discussed in greater detail, distinguishing between abstract interests and social interests enables the illustrated pipeline 20 to identify more relevant content for the user by, for example, potentially eliminating/downgrading recommendations that might be appropriate from an abstract interest standpoint but are inappropriate from a social interest standpoint (and vice versa).

The recommendation module 28 may generate one or more recommendations for the user based on the interest analysis and a current context of the user, wherein the sensor inference module 30 may determine the current context based on sensor data 32 (e.g., location data and/or social proximity data) associated with the user. For example, the location data may include Global Positioning System (GPS) coordinates, street addresses, etc., and the social proximity data may indicate who is nearby relative to the user. In one example, the social proximity data is determined via one or more wireless transmissions (e.g., near field communications/NFC, Wi-Fi, Bluetooth, etc.) between the user's device and the devices of nearby individuals and/or networks. Moreover, the front end interface 34 may present, among other things, the one or more recommendations to the user. As will be discussed in greater detail, using the sensor data 32 to generate the recommendations may enable the pipeline 20 to identify more relevant content for the user by, for example, potentially eliminating/downgrading recommendations that are inappropriate at a given moment in time but might be appropriate at another moment in time (e.g., in different social settings and/or surroundings).

Figure 2:
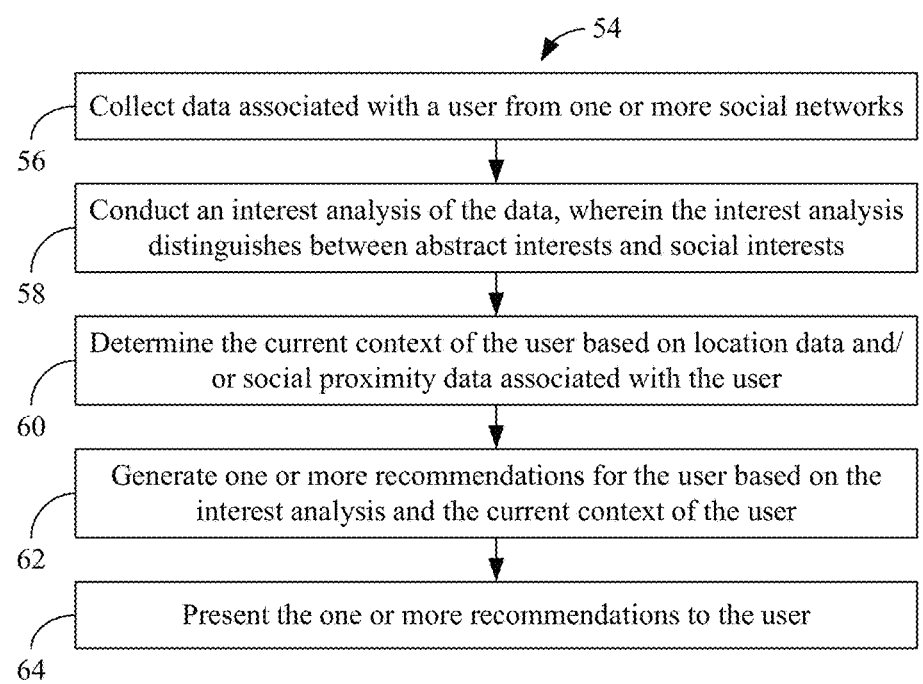
FIG. 2 is a flowchart of an example of a method of recommending content according to an embodiment.

Thus, FIG. 2 demonstrates a method 54 of recommending content. The method 54 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 54 may be written in any combination of one or more programming languages, including an object oriented programming language such as JAVA, Smalltalk, C++ or the like and conventional procedural programming languages, such as the "C" programming language or similar programming languages.

Illustrated processing block 56 provides for collecting data associated with a user from one or more social networks, wherein an interest analysis of the data may be conducted at block 58. As already noted, the interest analysis may distinguish between abstract interests and social interests. Block 60 may determine the current context of the user based on location data and/or social proximity data associated with the user. Additionally, one or more recommendations may be generated at block 62 based on the interest analysis and the current context of the user. Illustrated block 64 presents the one or more recommendations to the user.

Abstract Interests and Social Interests

Figure 3:
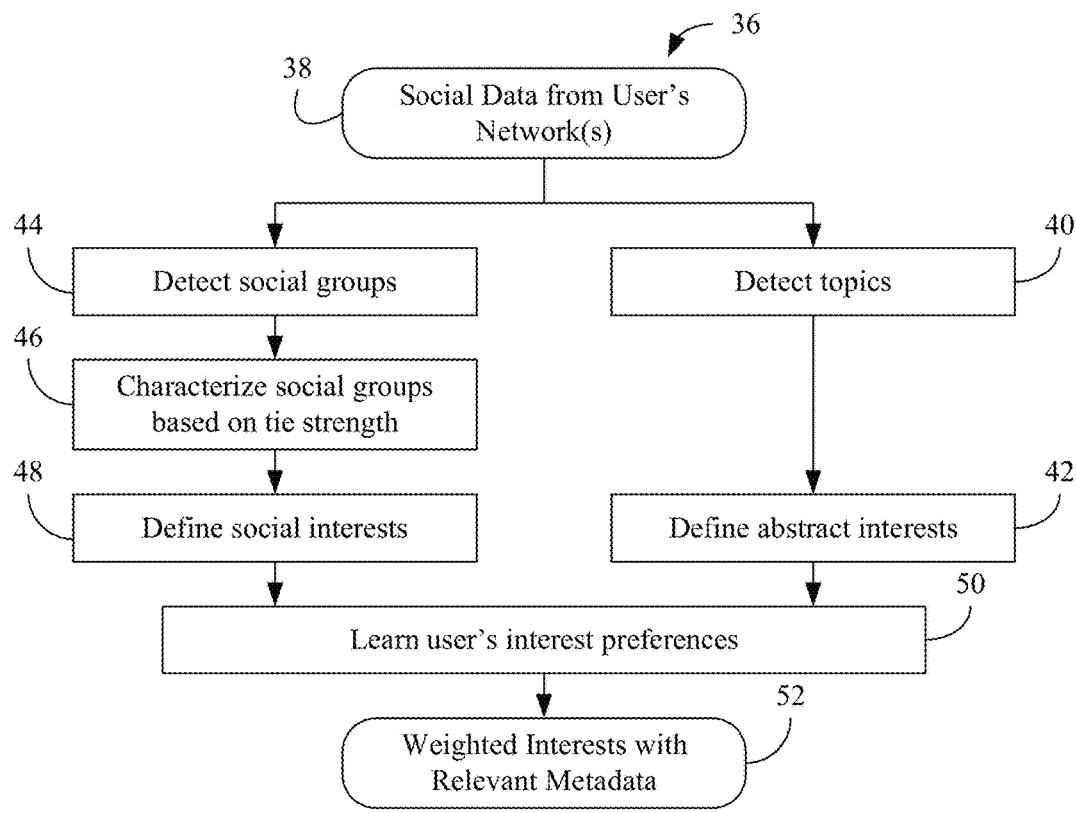
FIG. 3 is a flowchart of an example of a method of distinguishing between abstract interests and social interests according to an embodiment.

FIG. 3 shows a method 36 of distinguishing between abstract interests and social interests. The method 36 may be readily substituted for block 58 (FIG. 2), already discussed. Moreover, the method 36 may be implemented as one or more modules such as, for example, the interest detection module 24 (FIG. 1), in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

The illustrated method 36 generally acknowledges that a user's abstract interests may be driven by the user's passion for particular themes, whereas the user's social interests may be driven by the user's attraction and social ties to particular groups of individuals. Accordingly, illustrated processing block 40 uses the data 38 from the user's social networks, online profiles, posted documents and/or authored documents (e.g., collectively, the user's "social content") to detect one or more topics. These different topics may be considered to be potential abstract interests.

In one example, a clustering based topic modeling algorithm such as, for example, Latent Dirichlet Allocation (LDA), is used to obtain the topics present in the user's social content. LDA may be fed a series of documents, and from these documents discover the "topics" that occur in the collection of documents. A "topic" may be a collection of words that occur frequently together. Each document that is fed to LDA may either be a post from the user's social network (e.g., a photo with its tags, text from their online profile) or an online document owned by the user. The affinity that each post has to each discovered topic may then be obtained, and labeled with its most affined topic. Comments and likes from social media data may be labeled with the same topic of their parent post.

The amount of content a user has generated towards each specific topic may then be measured. In one example, the "K" topics with the most generated content may be defined at block 42 as the user's abstract interests. To leverage interests that may be more socially driven (e.g., the user's friends are discussing topic "X", so the user also posts about topic X), the designer of the interest detection module may be permitted to set how much certain user actions and certain social contexts are considered for weighting the user's abstract interests. Some designers might consider that if the user never posts about topic X, but rather only likes things about topic X that a particular social group or person posts, then topic X is not part of the user's abstract interests (e.g., instead topic X is a more socially driven interest). Similarly, other designers might not want to penalize the detection of topic X as an abstract interest when the user is merely liking or commenting on the content a particular person posts about X. In either instance, distinguishing between abstract interests and social interests may enable the recommendation system to be more effectively tailored to fit particular applications and/or circumstances.

In general, block 44 may provide for using the data 38 from the user's social content to detect one or more social groups. Illustrated block 46 discovers and characterizes the social groups present in the user's social network, wherein these social groups may be defined at block 48 as the user's social interests. In one example, social groups are characterized based on their social tie to the user, wherein a social group may be considered as including a set of users that tend to interact on the same pieces of content.

More particularly, the user's social content may be divided into time periods, and for each time period "t" a connection may be created between two users when under the same time period they commented or liked the same piece of content. Such an approach may result in the creation of a series of graphs. A technique such as, for example, the Clique Percolation Method (CPM) may be used to identify unique sets of cliques or groups Gi(t). Each of these groups may have users who interacted at least once on the same content in the studied time period. The interest detection module may also consider that social groups exist for some minimum period of time. Therefore, for each of the discovered groups in time period t, a determination may be made as to whether at least y % of its members are also present in the group for time period t+1. A set of groups that for J periods of time have been continuously present in the user's social network may then be identified; these persistent, non-ephemeral groups, may be labeled at block 44 as the social groups of the user's social network. These social groups may also represent the possible social interests of the user.

Block 46 may characterize the social tie the user has to each of the social groups detected in block 44. Example variables that may be analyzed to measure a user's social tie to others, include, but are not limited to:

Intensity: this variable may measure the amount of attention a user gives to a particular social group, based on the amount of online interactions directed to the group.

Intimacy: this variable may measure how close the user is to a particular social group, based on amount of intimacy words used in their social interactions. In one example, a linguistic dictionary such as, for example, a Linguistic Inquiry and Word Count (LIWC) dictionary, is used to determine the words that denote intimacy. A linguistic dictionary may help identify which words in a text match lists of categorical word stems. Intimacy words may be considered to be words that match categories related to, for example: Family, Friends, Home, Sexual, Swears, Work, Leisure, Money, Body, Religion, Health, and so forth.

Social connections: this variable may measure how many social connections in common a user has with a particular social group, based on the number of mutual friends, number of same online groups.

Emotional Variables: this variable may measure how emotional a user is when interacting with a particular social group based on the amount of arousal words used in the interaction. Arousal words may be identified by again matching words in user generated content against a linguistic dictionary that has an arousal category.

For each of the group variables, their values may be normalized with respect to the user's typical behavior with the rest of their social network. These variables may represent the social tie vector of the group. A mean-shift algorithm may be used to cluster together groups that present similar social tie vectors, wherein each of these clusters of groups may be considered to represent the different types of social groups present in the user's network. Thus, each cluster may be defined at block 48 as one of the user's social interests.

Block 50 may learn the user's interest preferences based on the defined abstract interests and social interests, and generate weighted interests with relevant metadata 52. More particularly, the preferences that the user manifests towards a possible social or abstract interest may be updated in block 50 based on the user's actions. Initially, it may be considered that all possible interests have the same weight. Going forward, different user interactions may influence the weight values differently. For example, if the user mentions or comments on content from a member of a social group belonging to a particular social interest, that interaction may increase the weight value between the user and that social interest. Likewise, if the user posts or comments on content related to an abstract interest, that interaction may increase the weight value between the user and the abstract interest. Accordingly, as time passes, illustrated block 50 learns the user's preferences.

If after a period of time the user does not provide interactions to the system, the system may recommend abstract and social interests that are the most popular in the user's community. Such an approach may function to overcome "cold starts".

The updating of relationship strengths may occur after each user interaction. The strength of relationship between a user "U" and an interest "I" (abstract or social) may be calculated as an example via a simple formula for simulated annealing (e.g., reinforcement learning).

$$W_I^U(I)_t = \alpha * W_I^U(I)_{t-1} + (1-\alpha) * A \quad (1)$$

Where, $W_I^U(I)_t$ is the new weight that the user U has manifested for interest I, $W_I^U(I)_{t-1}$ is the previous weight the user had manifested for the interest at time t−1, α is the learning rate of the system, and A is the action that user expresses to the interest I. The value of A may be set by the system designer. For example, the system designer may give different weights to mentioning a particular person in content, sharing particular content, commenting on certain content, liking certain content, among other possible user interactions. The interest detection module may then send the list of discovered interests, each with their categorization (abstract or social), weight (user preference) and characterization, to a visualization module such as the visualization module 26 (FIG. 1).

Personas

Figure 4:
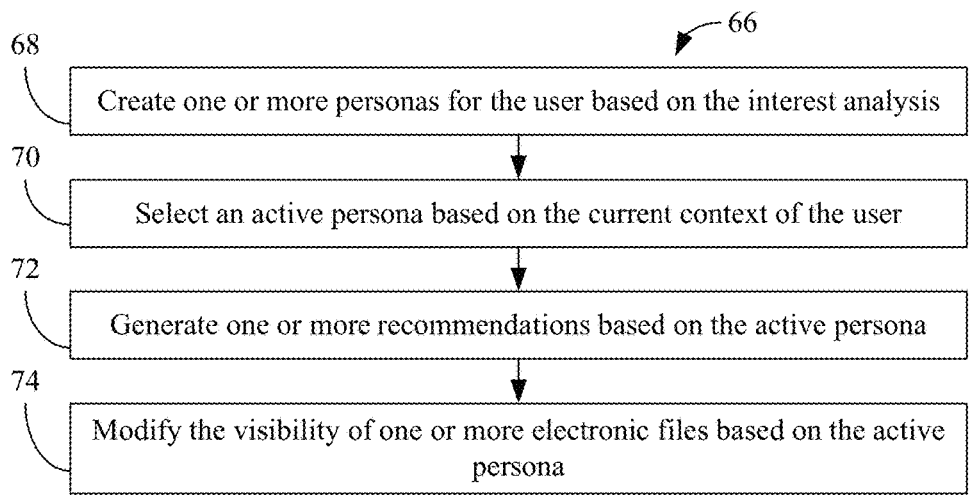
FIG. 4 is a flowchart of an example of a method of using personas to recommend content and control electronic file visibility according to an embodiment.

With continuing reference to FIGS. 1 and 4, a method 66 of using personas to recommend content and control electronic file visibility is shown. The method 66 may be implemented as one or more modules such as, for example, the visualization module 26 and/or the recommendation module 28 of the pipeline 20, in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 68 provides for creating one or more personas for the user based on the interest analysis, wherein an active persona may be automatically selected at block 70 based on the current context of the user. One or more recommendations may be generated at block 72 based on the active persona. Additionally, illustrated block 74 modifies the visibility of one or more electronic files based on the active persona.

In one example, the visualization module 26 includes a persona creator 26b that creates the personas based on the interest analysis and the recommendation module 28 includes a persona selector 28b that automatically selects the active persona based on the current context of the user. The persona selector 28b may use a decision tree to automatically identify the most appropriate user persona to be enabled. More particularly, the persona selector 28b may first analyze whether the current location of the user is mapped to a particular persona. If more than one persona is associated with that location, or if no persona has that location, the persona selector 28b may analyze whether the individuals around the user are mapped to a persona. Based on this information, the persona selector 28b may enable the most appropriate persona. If the location and individuals around the user have no mapping, the persona selector 28b may consider by default all of the discovered interests of the user.

The persona selector 28b may also enable the user to manually select their most appropriate persona via a menu, with the most probable personas being displayed on top for ease of selection. For example, the visualization module 26 may present, via the front end interface 34, the personas to the user along with the underlying basis for the personas, wherein the front end interface 34 may receive user input regarding the personas. The persona creator 26b may adapt the personas based on the user input. Such an approach may provide greater transparency of the system to the user and may improve overall performance. Thus, the recommendation module 28 may provide social content recommendations that are the most interesting to a user, and that are attuned with the current persona the user seeks to portray.

Figure 5:
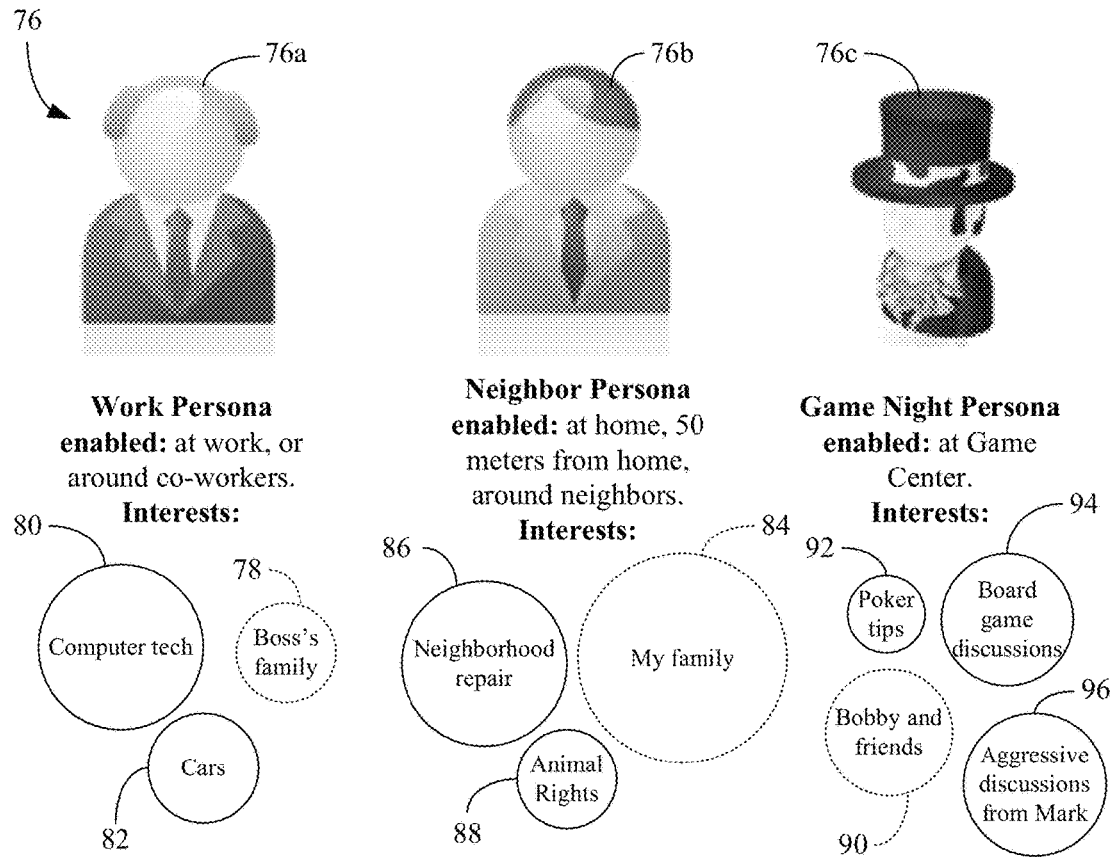
FIG. 5 is an illustration of an example of a set of personas according to an embodiment.

FIG. 5 demonstrates that a set of personas 76 (76a-76c) may be created for a user. In the illustrated example, a work persona 76a is activated/enabled when the user is at work or around her co-workers, wherein the work persona 76 may be created as a result of the social interests of the boss's family 78 and the abstract interests of computer technology 80 and cars 82. On the other hand, a neighborhood persona 76b might be activated/enabled when the user is at home, within fifty meters from home or around her neighbors, wherein the neighborhood persona 76b may be created from the social interests of the user's family 84 and the abstract interests of neighborhood repair 86 and animal rights 88. In addition, a game night persona 76c may be activated/enabled when the user is at a particular game center (e.g., bingo hall), wherein the game night persona 76c may be activated/enabled based on the social interests of Bobby and friends 90, and the abstract interests of poker tips 92, board game discussions 94, and aggressive discussions from Mark 96.

As already noted, the personas 76 as well as the underlying basis for the personas 76 may be made visible to the user. In this regard, various visualization techniques may be used to convey the types of interests (e.g., abstract versus social) as well as the relative weights of the underlying interests. For example, the illustrated approach varies the line consistency of the bubble/circle enclosing each interest based on the type of interest. Thus, the user may readily determine that cars 82 is an abstract interest (e.g., due to the solid line) for the work persona 76a, the user's family 84 is a social interest (e.g., due to the dashed line) for the neighbor persona 76b, board game discussions 94 is an abstract interest for the game night persona 76c, and so forth. Moreover, the illustrated approach varies the size of the bubble/circle enclosing each interest based on the weight of the interest. Thus, the user may readily determine that the social interest of computer technology 80 has very strong tie to the work persona 76a, the abstract interest of neighborhood repair 86 has a moderate tie to the neighbor persona 76b, the abstract interest of poker tips 92 has a weak tie to the game night persona 76c, and so forth. Other visualization techniques such as, for example, different colors, icons, etc., may also be used.

Figure 6:
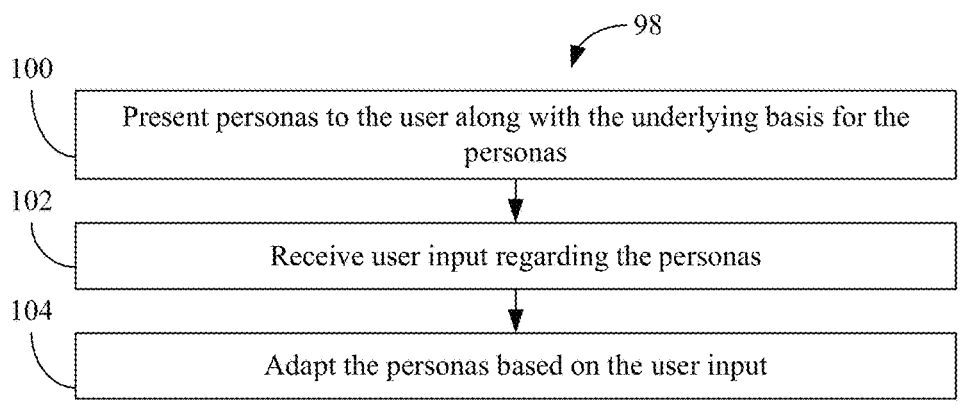
FIG. 6 is a flowchart of an example of a method of adapting personas according to an embodiment.

FIG. 6 shows a method 98 of adapting personas. The method 98 may be implemented as one or more modules such as, for example, the persona creator 26b (FIG. 1), in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 100 provides for presenting one or more personas such as, for example, the set of personas 76 (FIG. 5), to a user along with the underlying basis for the personas, wherein user input regarding the personas may be received at block 102. The user input may include, for example, changes to the personas (e.g., persona titles), the current context parameters used to activate the personas (e.g., where activated and/or around whom), the associated interests (e.g., social and/or abstract), and so forth. For instance, the user might state that "whenever I am at work or near one of my co-workers, enable my Work Persona, who is interested in Augmented Reality, Crafts, Stock Market, and positive online interactions involving may manager and work buddies; when I am with my family or friends, enable my Fun Aunt Persona, who is interested in Hunting, Crafts, STEM Education, and any online interactions from my family." Such an approach may enable the user to have more control over the type of content that they will receive and the type of personal interests their devices showcase under a certain scenario. Block 104 may adapt the one or more personas based on the user input.

File Visibility

Figure 7:
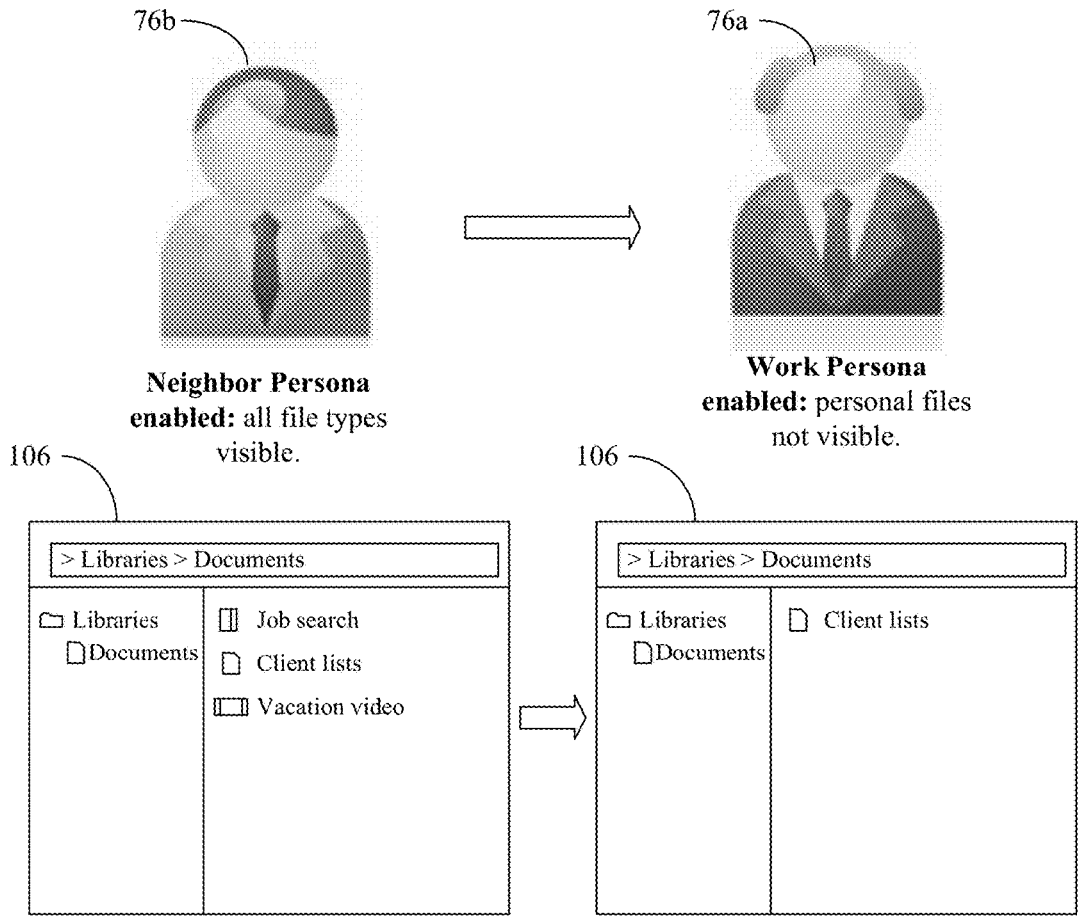
FIG. 7 is an illustration of an example of an electronic file visibility modification according to an embodiment.

With continuing reference to FIGS. 1 and 7, a scenario is demonstrated in which personas are used to modify the visibility of one or more electronic files stored on a device (e.g., desktop computer, notebook computer, tablet computer, convertible tablet, smart phone, personal digital assistant/PDA, mobile Internet device/MID) associated with the user. In the illustrated example, when the neighbor persona 76b is active, a directory listing 106 shows a folder entitled "Job search", a document entitled "Client lists" and a media file entitled "Vacation video". When the work persona 76a is active, on the other hand, the "Job search" folder and the "Vacation video" media file are hidden from view. Accordingly, the co-workers, managers, etc., of the user may be automatically prevented from seeing particular files, in the illustrated example. The files that are selectively hidden may include, but are not limited to, computer programs (e.g., executable files), documents, spreadsheets, databases, social networking content (e.g., photos, friend listings and other profile information), folders, and so forth. The illustrated approach therefore provides the user with a greater level of self-presentation that is sensitive to different social settings and/or surroundings.

In one example, the recommendation module 28 of the pipeline 20 includes an operating system interface 28a to modify the visibility of one or more electronic files based on the active persona.

Interest Modifications

Figure 8:
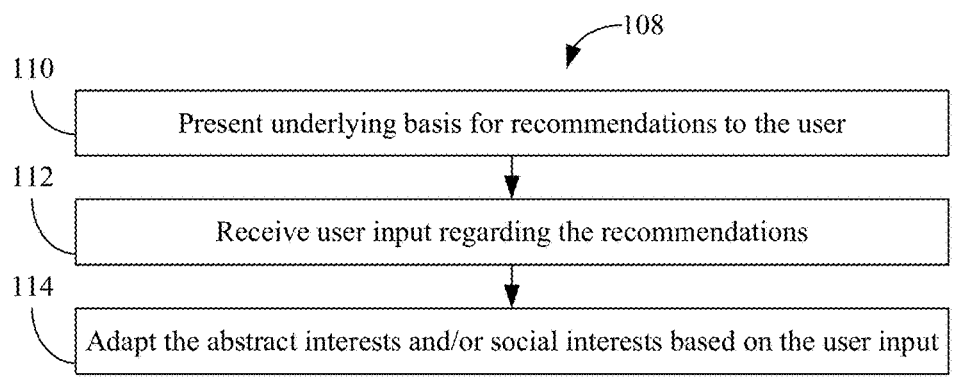
FIG. 8 is a flowchart of an example of a method of adapting interests according to an embodiment.

With continuing reference to FIGS. 1 and 8, a method 108 of adapting interests is shown. The method 108 may be implemented as one or more modules such as, for example, the visualization module 26 of the pipeline 20, in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 110 provides for presenting the underlying basis for one or more recommendations to a user, wherein user input regarding the recommendations may be received at block 112. Additionally, the abstract interests and/or social interests of the user may be adapted at block 114 based on the user input.

In one example, the visualization module 26 presents, via the front end interface 34, the underlying basis for the recommendations, wherein the front end interface 34 receives the user input regarding the recommendations. The visualization module 26 may also include an interest modifier 26a that adapts one or more of the abstract interests or the social interests based on the user input.

Figure 9:
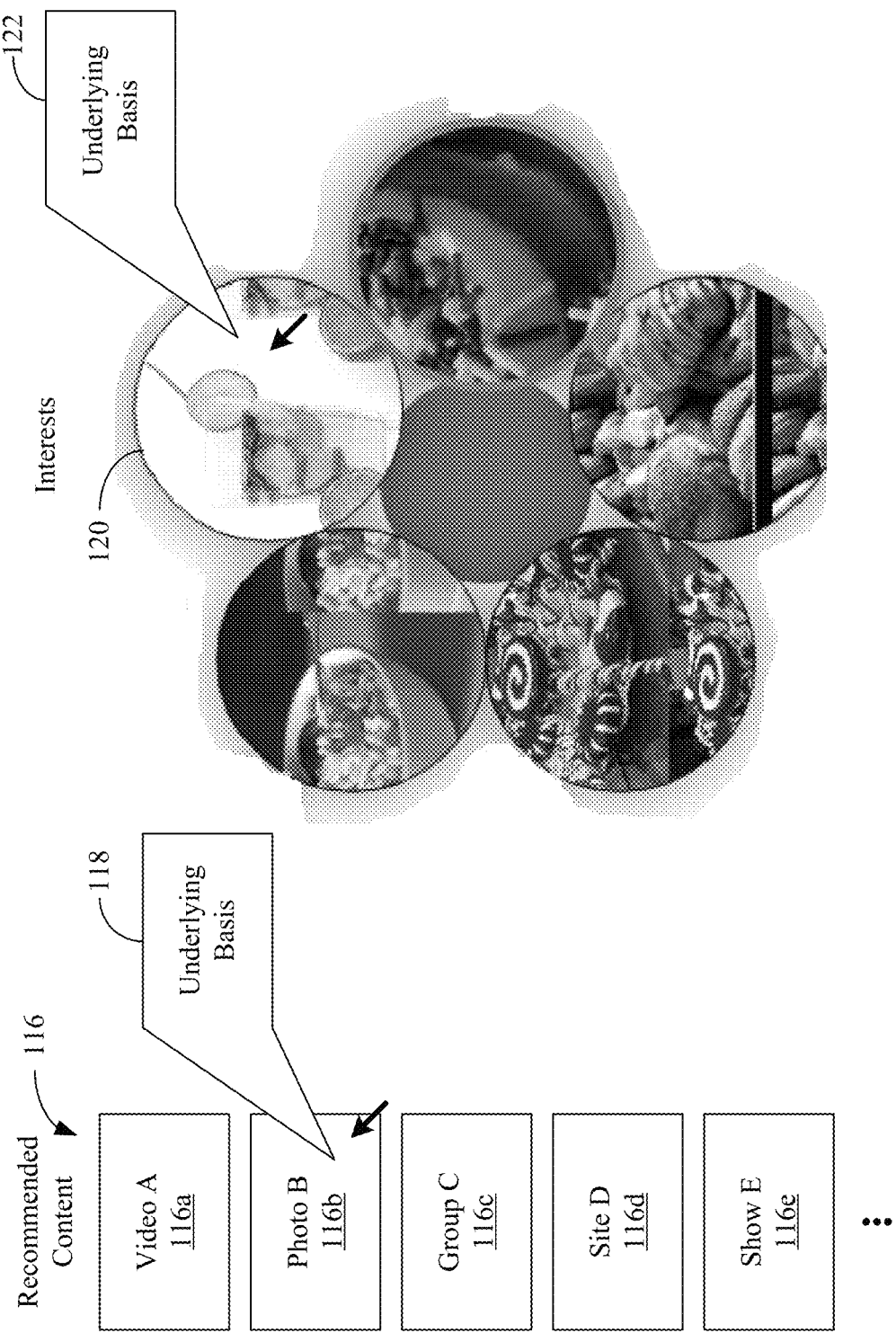
FIG. 9 is an illustration of an example of a plurality of recommendations and associated interests according to an embodiment

FIG. 9 demonstrates that a set of recommended content 116 (116a-116e, e.g., one or more recommendations) may be presented to the user along with the underlying basis for the recommended content 116. In the illustrated example, when the user hovers the cursor over a particular recommendation such as, for example, a photo recommendation 116b ("Photo B"), the user is provided with an underlying basis explanation 118 (e.g., "Photo tags are noodle, delicious, meal, and you seem to be into: food). Similarly, when the user hovers the cursor over a particular interest such as, for example, an abstract interest 120, the user may be provided with an underlying basis explanation 122 (e.g., "still life, white, green, lime, lemonade, mint, mojito"). The specific examples provided herein are to facilitate discussion only and may vary depending upon the circumstances.

Figure 10:
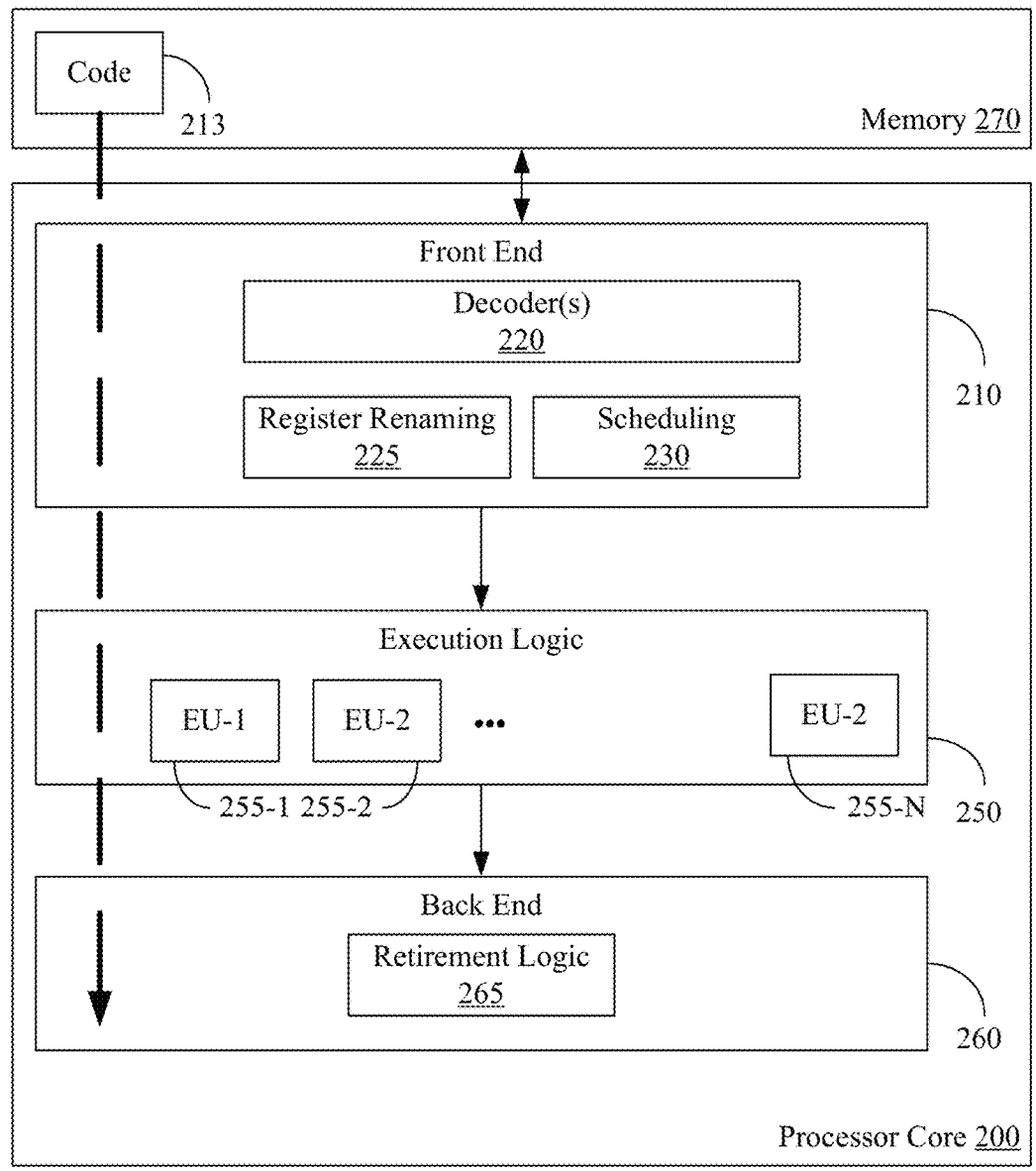
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 54 (FIG. 2), the method 66 (FIG. 4), the method 98 (FIG. 6) and/or the method 108 (FIG. 8), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 11, shown is a block diagram of a system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 54 (FIG. 2), the method 66 (FIG. 4), the method 98 (FIG. 6) and/or the method 108 (FIG. 8), already discussed, and may be similar to the code 213 (FIG. 10), already discussed. Further, an audio I/O 1024 may be coupled to second bus 1020.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

ADDITIONAL NOTES AND EXAMPLES

Example 1 may include an apparatus to recommend content, comprising an interest detection module to conduct an interest analysis of data associated with a user, wherein the interest analysis distinguishes between abstract interests and social interests, a recommendation module to generate one or more recommendations for the user based on the interest analysis and a current context of the user, and a visualization module to present the one or more recommendations to the user.

Example 2 may include the apparatus of Example 1, wherein the abstract interests are to identify types of topics and types of objects, and wherein the social interests are to identify types of social groups.

Example 3 may include the apparatus of Example 1, further including a persona creator to create one or more personas for the user based on the interest analysis, and a persona selector to select an active persona based on the current context of the user, wherein the one or more recommendations are to be generated based on the active persona.

Example 4 may include the apparatus of Example 3, further including a visualization module to present, via the front end interface, the one or more personas to the user along with an underlying basis for the one or more personas, wherein the front end interface is to receive user input regarding the one or more personas, and the persona creator is to adapt the one or more personas based on the user input.

Example 5 may include the apparatus of Example 3, further including an operating system interface to modify a visibility of one or more electronic files based on the active persona.

Example 6 may include the apparatus of Example 1, further including a visualization module to present, via the front end interface, an underlying basis for the one or more recommendations to the user, wherein the front end interface is to receive user input regarding the one or more recommendations, and an interest modifier to adapt one or more of the abstract interests or the social interests based on the user input.

Example 7 may include the apparatus of any one of Examples 1 to 6, further including a crawling module to collect the data associated with the user from one or more of a social network, an online profile, a posted document or an authored document.

Example 8 may include the apparatus of any one of Examples 1 to 6, further including a sensor inference module to determine the current context based on one or more of location data or social proximity data associated with the user.

Example 9 may include a method of recommending content, comprising conducting an interest analysis of data associated with a user, wherein the interest analysis distinguishes between abstract interests and social interests, generating one or more recommendations for the user based on the interest analysis and a current context of the user, and presenting the one or more recommendations to the user.

Example 10 may include the method Example 9, wherein the abstract interests identify types of topics and types of objects, and wherein the social interests identify types of social groups.

Example 11 may include the method of Example 9, further including creating one or more personas for the user based on the interest analysis, and selecting an active persona based on the current context of the user, wherein the one or more recommendations are generated based on the active persona.

Example 12 may include the method of Example 11, further including presenting the one or more personas to the user along with an underlying basis for the one or more personas, receiving user input regarding the one or more personas, and adapting the one or more personas based on the user input.

Example 13 may include the method of Example 11, further including modifying a visibility of one or more electronic files based on the active persona.

Example 14 may include the method of Example 9, further including presenting an underlying basis for the one or more recommendations to the user, receiving user input regarding the one or more recommendations, and adapting one or more of the abstract interests or the social interests based on the user input.

Example 15 may include the method of any one of Examples 9 to 14, further including collecting the data associated with the user from one or more of a social network, an online profile, a posted document or an authored document.

Example 16 may include the method of any one of Examples 9 to 14, further including determining the current context based on one or more of location data or social proximity data associated with the user.

Example 17 may include at least one computer readable storage medium comprising a set of instructions which, when executed by a computing device, cause the computing device to conduct an interest analysis of data associated with a user, wherein the interest analysis is to distinguish between abstract interests and social interests, and present the one or more recommendations to the user.

Example 18 may include the at least one computer readable storage medium of Example 17, wherein the abstract interests are to identify types of topics and types of objects, and wherein the social interests are to identify types of social groups.

Example 19 may include the at least one computer readable storage medium of Example 17, wherein the instructions, when executed, cause a computing device to create one or more personas for the user based on the interest analysis, and select an active persona based on the current context of the user, wherein the one or more recommendations are to be generated based on the active persona.

Example 20 may include the at least one computer readable storage medium of Example 19, wherein the instructions, when executed, cause a computing device to present the one or more personas to the user along with an underlying basis for the one or more personas, receive user input regarding the one or more personas, and adapt the one or more personas based on the user input.

Example 21 may include the at least one computer readable storage medium of Example 19, wherein the instructions, when executed, cause a computing device to modify a visibility of one or more electronic files based on the active persona.

Example 22 may include the at least one computer readable storage medium of Example 17, wherein the instructions, when executed, cause a computing device to present an underlying basis for the one or more recommendations to the user, receive user input regarding the one or more recommendations, and adapt one or more of the abstract interests or the social interests based on the user input.

Example 23 may include the at least one computer readable storage medium of any one of Examples 17 to 22, wherein the instructions, when executed, cause a computing device to collect the data associated with the user from one or more of a social network, an online profile, a posted document or an authored document.

Example 24 may include the at least one computer readable storage medium of any one of Examples 17 to 22, wherein the instructions, when executed, cause a computing device to determine the current context based on one or more of location data or social proximity data associated with the user.

Example 25 may include an apparatus to recommend content, comprising means for performing the method of any one of Examples 9 to 16.

Thus, techniques described herein may consider how the co-participation behavior of content users might also influence a particular user interest for such content. Moreover, all of the different social dynamics that might lead a user to be interested in certain content may be considered. For example, some users may be more driven to participate in content where they know the other individuals participating and the conversations are very emotional. Leveraging such information in the recommendation process may yield much more accurate and effective results. Additionally, social content recommendations may be attuned to the type of persona that the user currently wishes to portray. Techniques may also provide transparent data representations that allow the user to understand why the system classified certain content as an abstract or social interest, and the data elements that are influencing each interest. In addition, techniques enable the user to easily understand the identified interests from their data, as well as define and control the type of recommendations received for each of their portrayed personas.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. An apparatus comprising:
an interest detection module, implemented at least partly in one or more of configurable logic devices or fixed functionality logic hardware, to conduct an interest analysis of data associated with a user, wherein the interest analysis distinguishes between abstract interests and social interests by clustering data associated with the user;
a recommendation module, implemented at least partly in one or more of configurable logic devices or fixed functionality logic hardware, to generate one or more recommendations for the user based on the interest analysis and a current context of the user;
a front end interface to present the one or more recommendations to the user;
a persona creator to create one or more personas for the user based on the interest analysis;
a persona selector to select an active persona based on the current context of the user, wherein the one or more recommendations are to be generated based on the active persona; and
an operating system interface to modify a visibility of one or more electronic files based on the active persona, wherein the abstract interests are to identify types of topics and types of objects, and wherein the social interests are to identify types of social groups.

2. The apparatus of claim 1, further including a visualization module, implemented at least partly in one or more of configurable logic devices or fixed functionality logic hardware, to present, via the front end interface, the one or more personas to the user along with an underlying basis for the one or more personas, wherein the front end interface is to receive user input regarding the one or more personas, and the persona creator is to adapt the one or more personas based on the user input.

3. The apparatus of claim 1, further including:
a visualization module, implemented at least partly in one or more of configurable logic devices or fixed functionality logic hardware, to present, via the front end interface, an underlying basis for the one or more recommendations to the user, wherein the front end interface is to receive user input regarding the one or more recommendations; and
an interest modifier to adapt one or more of the abstract interests or the social interests based on the user input.

4. The apparatus of claim 1, further including a crawling module, implemented at least partly in one or more of configurable logic devices or fixed functionality logic hardware, to collect the data associated with the user from one or more of a social network, an online profile, a posted document or an authored document.

5. The apparatus of claim 1, further including a sensor inference module, implemented at least partly in one or more of configurable logic devices or fixed functionality logic hardware, to determine the current context based on one or more of location data or social proximity data associated with the user.

6. A method comprising:
conducting an interest analysis of data associated with a user, wherein the interest analysis distinguishes between abstract interests and social interests by clustering data associated with the user;
generating one or more recommendations for the user based on the interest analysis and a current context of the user;
presenting the one or more recommendations to the user;
creating one or more personas for the user based on the interest analysis;
selecting an active persona based on the current context of the user, wherein the one or more recommendations are generated based on the active persona; and
modifying a visibility of one or more electronic files based on the active persona, wherein the abstract interests identify types of topics and types of objects, and wherein the social interests identify types of social groups.

7. The method of claim 6, further including:
presenting the one or more personas to the user along with an underlying basis for the one or more personas;
receiving user input regarding the one or more personas; and
adapting the one or more personas based on the user input.

8. The method of claim 6, further including:
presenting an underlying basis for the one or more recommendations to the user;
receiving user input regarding the one or more recommendations; and
adapting one or more of the abstract interests or the social interests based on the user input.

9. The method of claim 6, further including collecting the data associated with the user from one or more of a social network, an online profile, a posted document or an authored document.

10. The method of claim 6, further including determining the current context based on one or more of location data or social proximity data associated with the user.

11. At least one non-transitory computer readable storage medium comprising a set of instructions which, when executed by a computing device, cause the computing device to:
conduct an interest analysis of data associated with a user, wherein the interest analysis is to distinguish between abstract interests and social interests by clustering data associated with the user;
generate one or more recommendations for the user based on the interest analysis and a current context of the user;
present the one or more recommendations to the user;
create one or more personas for the user based on the interest analysis;
select an active persona based on the current context of the user, wherein the one or more recommendations are to be generated based on the active persona; and
modify a visibility of one or more electronic files based on the active persona, wherein the abstract interests are to identify types of topics and types of objects, and wherein the social interests are to identify types of social groups.

12. The at least one non-transitory computer readable storage medium of claim 11, wherein the instructions, when executed, cause a computing device to:
present the one or more personas to the user along with an underlying basis for the one or more personas;
receive user input regarding the one or more personas; and
adapt the one or more personas based on the user input.

13. The at least one non-transitory computer readable storage medium of claim 11, wherein the instructions, when executed, cause a computing device to:
present an underlying basis for the one or more recommendations to the user;
receive user input regarding the one or more recommendations; and
adapt one or more of the abstract interests or the social interests based on the user input.

14. The at least one non-transitory computer readable storage medium of claim 11, wherein the instructions, when executed, cause a computing device to collect the data associated with the user from one or more of a social network, an online profile, a posted document or an authored document.

15. The at least one non-transitory computer readable storage medium of claim 11, wherein the instructions, when executed, cause a computing device to determine the current context based on one or more of location data or social proximity data associated with the user.

* * * * *